(12) United States Patent
Cho

(10) Patent No.: US 11,512,908 B2
(45) Date of Patent: Nov. 29, 2022

(54) EVAPORATOR WITH GROOVED CHANNELS

(71) Applicant: Hamilton Sundstrand Corporation, Charlotte, NC (US)

(72) Inventor: Wei-Lin Cho, Unionville, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 131 days.

(21) Appl. No.: 16/780,154

(22) Filed: Feb. 3, 2020

(65) Prior Publication Data

US 2021/0239407 A1    Aug. 5, 2021

(51) Int. Cl.
F28F 1/06 (2006.01)
F28D 15/02 (2006.01)
B64G 1/50 (2006.01)

(52) U.S. Cl.
CPC ............ *F28F 1/06* (2013.01); *F28D 15/0233* (2013.01); *B64G 1/506* (2013.01)

(58) Field of Classification Search
CPC ......... F28D 1/05375; F28D 2021/0021; F28D 2021/0071; F28D 15/0233; F28D 2021/0064; F28F 1/06; F28F 9/0282; F28F 9/24; F28F 9/027; F28F 9/0246; F28F 9/028; F25B 41/385; B05B 1/3447
See application file for complete search history.

(56) References Cited

U.S. PATENT DOCUMENTS

| 4,869,313 A | 9/1989 | Fredley |
| 4,934,160 A | 6/1990 | Mueller |
| 5,101,884 A | 4/1992 | Leidinger |
| 5,158,133 A | 10/1992 | Duong |
| 6,190,616 B1 | 2/2001 | Jovanovich et al. |
| 6,263,678 B1 | 7/2001 | Suttrop |
| 7,337,834 B2 | 3/2008 | Antonijevic et al. |

(Continued)

FOREIGN PATENT DOCUMENTS

| EP | 2357440 A1 * | 8/2011 | .............. B23P 15/26 |
| EP | 2357440 A1 | 8/2011 | |

(Continued)

OTHER PUBLICATIONS

Shukla, K.N., Heat Pipe for Aerospace Applications—an Overview, 2015, Journal of Electronics Cooling and Thermal Control, p. 5-6 (Year: 2015).*

(Continued)

*Primary Examiner* — Tavia Sullens
*Assistant Examiner* — Stephanus Y Chung
(74) *Attorney, Agent, or Firm* — Cantor Colburn LLP

(57) ABSTRACT

An evaporator element is provided and includes a body defining channels, each of which includes grooves respectively delimited by first and second interior facing sidewalls of the body which form a base and an apex with an apex angle opposite the base and defined such that, for a fluid flow moving through one of the channels in a microgravity environment a portion of the fluid flow in a liquid phase within a groove of the channel will move in the groove from the base to the apex and a portion of the fluid flow in a vapor phase within a groove of the channel will move in the groove from the apex to the base.

16 Claims, 4 Drawing Sheets

(56) References Cited

U.S. PATENT DOCUMENTS

| | | | |
|---|---|---|---|
| 8,234,881 B2* | 8/2012 | Yanik | F28D 1/05341 |
| | | | 62/515 |
| 2004/0159423 A1 | 8/2004 | Brannmark et al. | |
| 2004/0244382 A1 | 12/2004 | Hagen et al. | |
| 2005/0051318 A1 | 3/2005 | Fujita et al. | |
| 2005/0274506 A1 | 12/2005 | Bhatti et al. | |
| 2007/0130769 A1 | 6/2007 | Moon et al. | |
| 2008/0217483 A1 | 9/2008 | Hugon et al. | |
| 2009/0294112 A1 | 12/2009 | Reifel et al. | |
| 2010/0320294 A1 | 12/2010 | Neumann et al. | |
| 2012/0288226 A1* | 11/2012 | Konde | F16C 33/26 |
| | | | 384/590 |

FOREIGN PATENT DOCUMENTS

| | | | |
|---|---|---|---|
| JP | 5253771 | * | 4/1977 |
| JP | S62118502 | * | 7/1987 |
| JP | H0512400 U | | 2/1993 |
| JP | 2006010119 A | | 1/2006 |
| JP | 2012098007 A | | 5/2012 |
| WO | 2006083448 A1 | | 8/2006 |
| WO | 2014125260 A1 | | 8/2014 |

OTHER PUBLICATIONS

European Search Report Application No. EP21154911: dated Jun. 25, 2021; pp. 8.
European Search Report Application No. EP21154435; dated Jun. 21, 2021; pp. 7.

* cited by examiner

EVAPORATOR WITH GROOVED CHANNELS

BACKGROUND

The following description relates to evaporators and, more particularly, to an evaporator with grooved channels for terrestrial and microgravity environments.

Evaporators utilize latent heat of a fluid to absorb waste heat from a heat source. As such, in order to operate efficiently, an evaporating surface of an evaporator should be covered by a layer of a liquid phase of a working fluid as much as possible during operational conditions.

The liquid phase of a working fluid (i.e., liquid) tends to accumulate and move in the direction of gravity in a terrestrial environment. In a microgravity environment, liquid distribution is randomized and tends to move freely if undisturbed. Therefore, in each of these terrestrial and microgravity environment cases, it is often critical to replenish evaporating surfaces of evaporators with liquid.

BRIEF DESCRIPTION

According to an aspect of the disclosure, an evaporator element is provided and includes a body defining channels, each of which includes grooves respectively delimited by first and second interior facing sidewalls of the body which form a base and an apex with an apex angle opposite the base and defined such that, for a fluid flow moving through one of the channels in a microgravity environment a portion of the fluid flow in a liquid phase within a groove of the channel will move in the groove from the base to the apex and a portion of the fluid flow in a vapor phase within a groove of the channel will move in the groove from the apex to the base.

In accordance with additional or alternative embodiments, the channels are arrayed in a linear formation.

In accordance with additional or alternative embodiments, each of the channels has a same shape.

In accordance with additional or alternative embodiments, each of the grooves is immediately adjacent to neighboring grooves.

In accordance with additional or alternative embodiments, each of the grooves has a same shape.

In accordance with additional or alternative embodiments, the grooves are circumferentially arrayed to extend outwardly from an open central region.

In accordance with additional or alternative embodiments, the apex angle is $2\beta$ and $\beta$ is less than 90° minus a solid-liquid contact angle.

According to an aspect of the disclosure, an evaporator element is provided and includes a body defining channels, each of which includes grooves respectively delimited by first and second interior facing sidewalls of the body which form an apex angle $2\beta$, where $\beta$ is less than 90° minus a solid-liquid contact angle.

In accordance with additional or alternative embodiments, the channels are arrayed in a linear formation.

In accordance with additional or alternative embodiments, each of the channels has a same shape.

In accordance with additional or alternative embodiments, each of the grooves is immediately adjacent to neighboring grooves.

In accordance with additional or alternative embodiments, each of the grooves has a same shape.

In accordance with additional or alternative embodiments, the grooves are circumferentially arrayed to extend outwardly from an open central region.

According to an aspect of the disclosure, an evaporator is provided and includes first and second headers and a body interposed between the first and second headers and defining channels to permit fluid flow between the first and second headers. Each channel includes grooves respectively delimited by first and second interior facing sidewalls of the body which form a base and an apex with an apex angle opposite the base and defined such that, for a fluid flow moving through one of the channels in a microgravity environment a portion of the fluid flow in a liquid phase within a groove of the channel will move in the groove from the base to the apex and a portion of the fluid flow in a vapor phase within a groove of the channel will move in the groove from the apex to the base.

In accordance with additional or alternative embodiments, the channels are arrayed in a linear formation and each of the channels has a same shape.

In accordance with additional or alternative embodiments, each of the grooves is immediately adjacent to neighboring grooves and each of the grooves has a same shape.

In accordance with additional or alternative embodiments, the grooves are circumferentially arrayed to extend outwardly from an open central region.

In accordance with additional or alternative embodiments, the apex angle is $2\beta$, where $\beta$ is less than 90° minus a solid-liquid contact angle.

In accordance with additional or alternative embodiments, orifice inserts are respectively interposable between one of the first and second headers and a corresponding channel.

In accordance with additional or alternative embodiments, each orifice insert includes a center plug defining multiple inflow channels and a ring feature disposed about the center plug and defining a plenum with which termination points of the multiple inflow channels are fluidly communicative.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

Movement of liquid in a microgravity environment is mainly dictated by a surface tension of the liquid, characteristics of a surface the liquid is intended to be in contact with and external disturbances applied to the system. In a terrestrial environment, the liquid will tend to pool and flow in the direction of gravity. In either case, in a properly designed groove, liquid can be replenished into the groove and vapor can be expelled out of the groove at similar rates which is useful in the replenishment of liquid on an evaporating surface of an evaporator. As such, as will be described below, a groove geometry in which liquid can be replenished into the groove and vapor can be expelled out of the groove at similar rates in integrated into an evaporator design. The evaporator design is therefore suitable for both terrestrial and microgravity environments.

Figure 1:
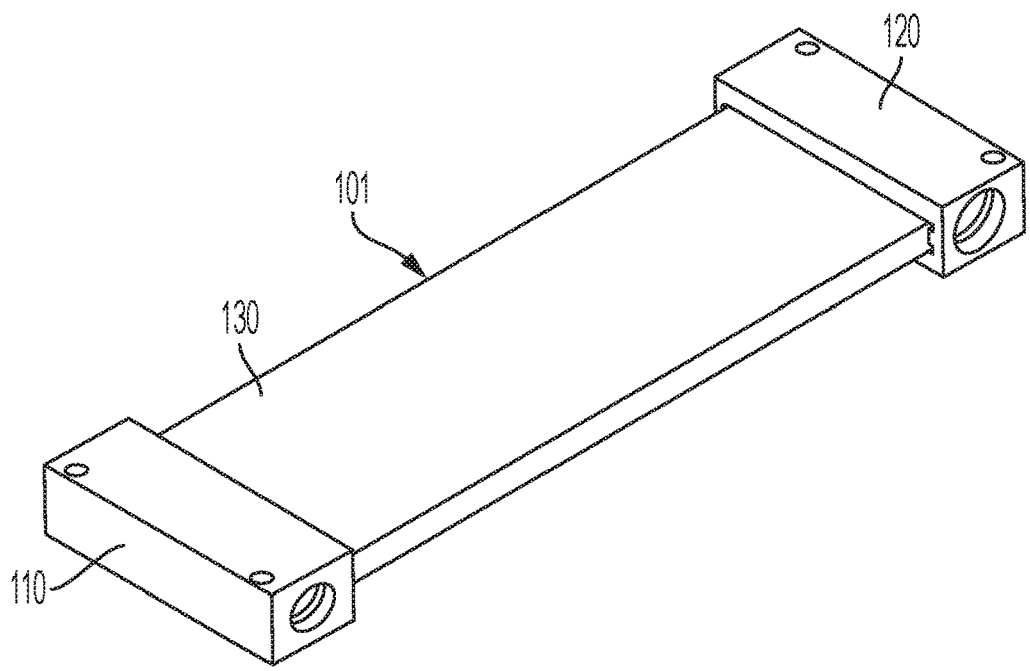
FIG. 1 is a perspective view of an evaporator element in accordance with embodiments.
Figure 2:
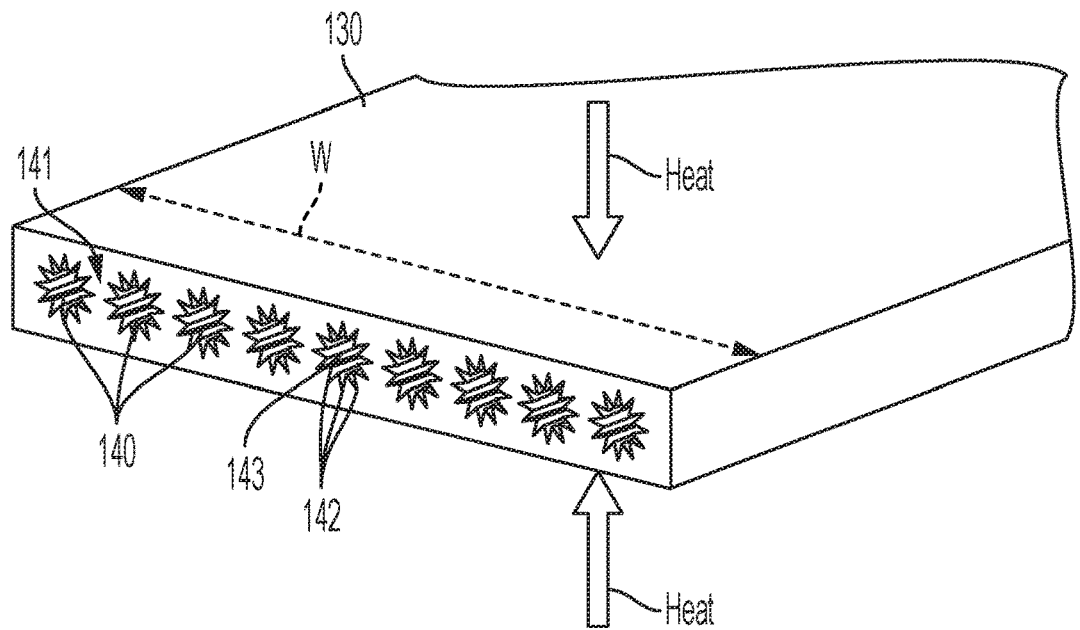
FIG. 2 is a perspective view of a body and grooves channels of the evaporator element of FIG. 1 in accordance with embodiments.
Figure 3:
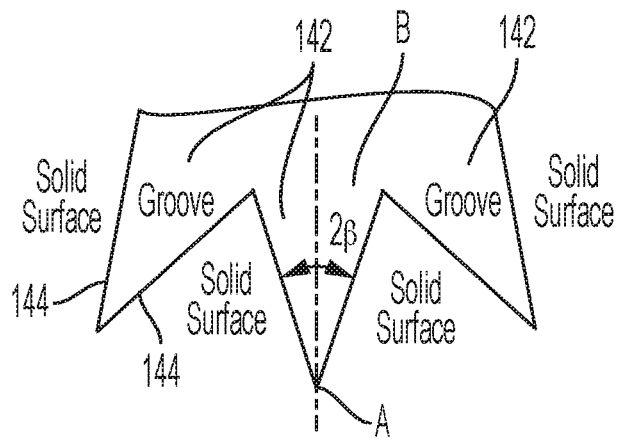
FIG. 3 is an axial view illustrating a configuration of the grooves of the grooves channels of FIG. 2 in accordance with embodiments.

With reference to FIGS. 1-3, an evaporator element 101 is provided and includes a first header (hereinafter referred to as an "inlet header") 110, a second header (hereinafter referred to as an "outlet header") 120 and a body 130. The body 130 is formed to define channels 140 that may be arranged in a linear formation 141 across a width W of the body 130. Each of the channels 140 can have a substantially same shape as the others and includes grooves 142 that are circumferentially arrayed to extend radially outwardly from an open central region 143.

Each of the grooves 142 has a same shape as the others and is immediately adjacent to neighboring grooves 142. In addition, each of the grooves 142 is delimited by first and second interior facing sidewalls 144 of the body 130. The first and second interior facing sidewalls 144 are tapered toward each other to form a base B and an apex A. The apex A is opposite the base B and has an apex angle 2β where β is less than 90° minus a solid-liquid contact angle. That is, the apex angle 2β is defined such that, for a fluid flow moving through one of the channels 140 in a microgravity environment where a portion of the fluid flow is in a liquid phase and another portion of the fluid flow is in a vapor phase, the portion of the fluid flow in the liquid phase within a particular groove 142 of the channel 140 will move in the particular groove 142 from the base B to the apex A and the portion of the fluid flow in the vapor phase within the particular groove 142 will move in the particular groove 142 from the apex A to the base B.

Figure 4:
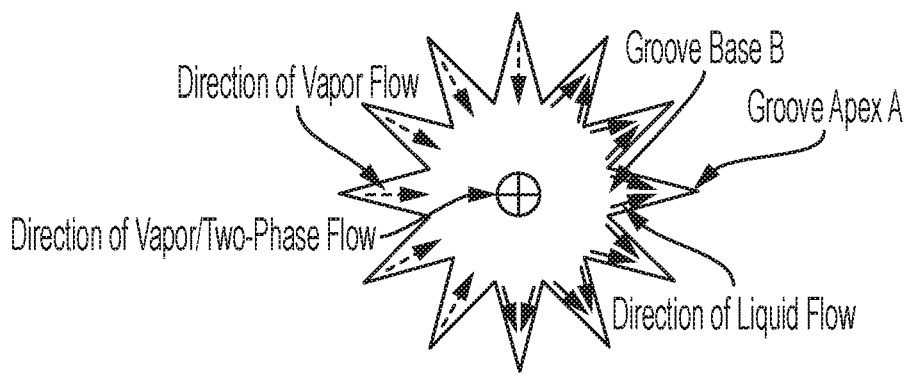
FIG. 4 is an illustration of an operation of the groove channels of FIG. 2 in a microgravity environment in accordance with embodiments.

With reference to FIG. 4, an operation of the channels 140 and the grooves 142 in a microgravity environment is illustrated. As shown in FIG. 4, in the microgravity environment, once liquid contacts the first and second interior facing sidewalls 144 of each of the grooves 142, the liquid moves in the direction from the base B and to the apex A. After vaporization by exposure of the body 130 to heat, the vapor is expelled from the apex A toward the base B and to the open central region 143.

Figure 5:
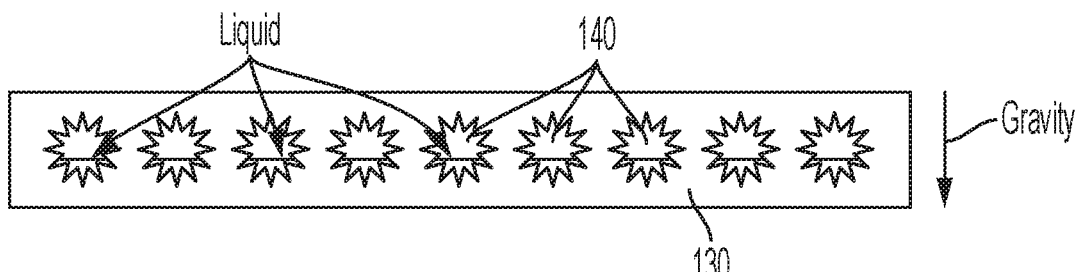
FIG. 5 is an illustration of an operation of the groove channels of FIG. 2 in a gravity field in accordance with embodiments.

With reference to FIG. 5, an operation of the channels 140 and the grooves 142 in a gravity field is illustrated. As shown in FIG. 5, due to the influence of gravity, the liquid is mostly accumulated at the bottom portion of the channels 140. Nevertheless, since heat applied to the body 130 can be conducted to the liquid, vaporization of the liquid is still possible.

Figure 6:
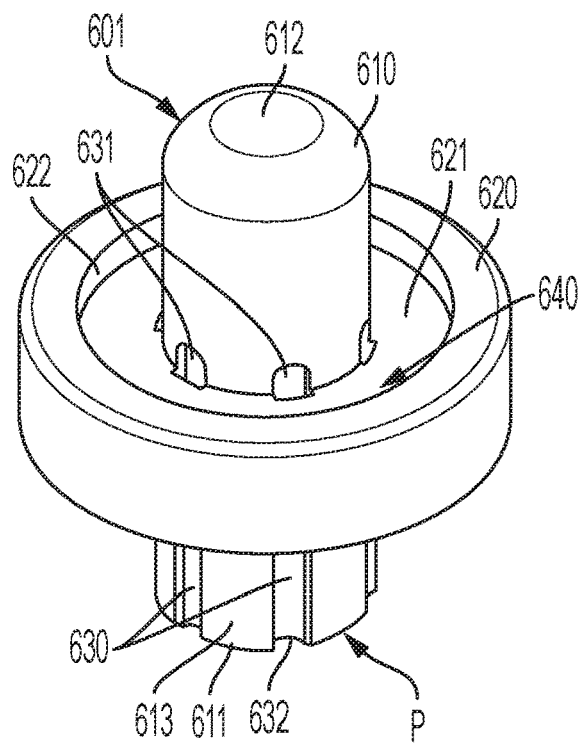
FIG. 6 is a perspective view of an orifice insert in accordance with embodiments.
Figure 7:
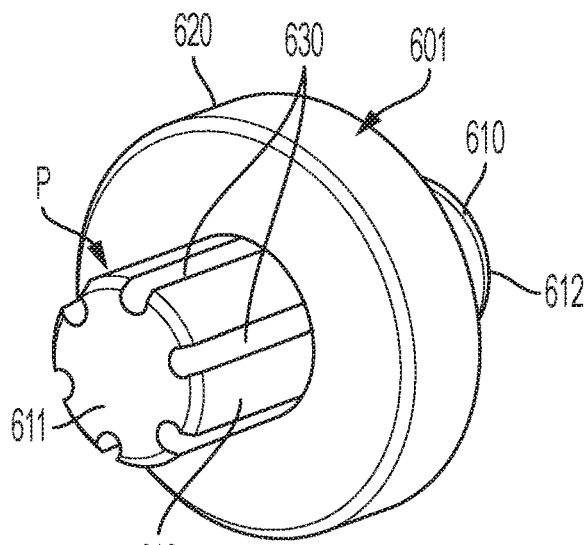
FIG. 7 is a perspective view of the orifice insert of FIG. 6 in accordance with embodiments.
Figure 8:
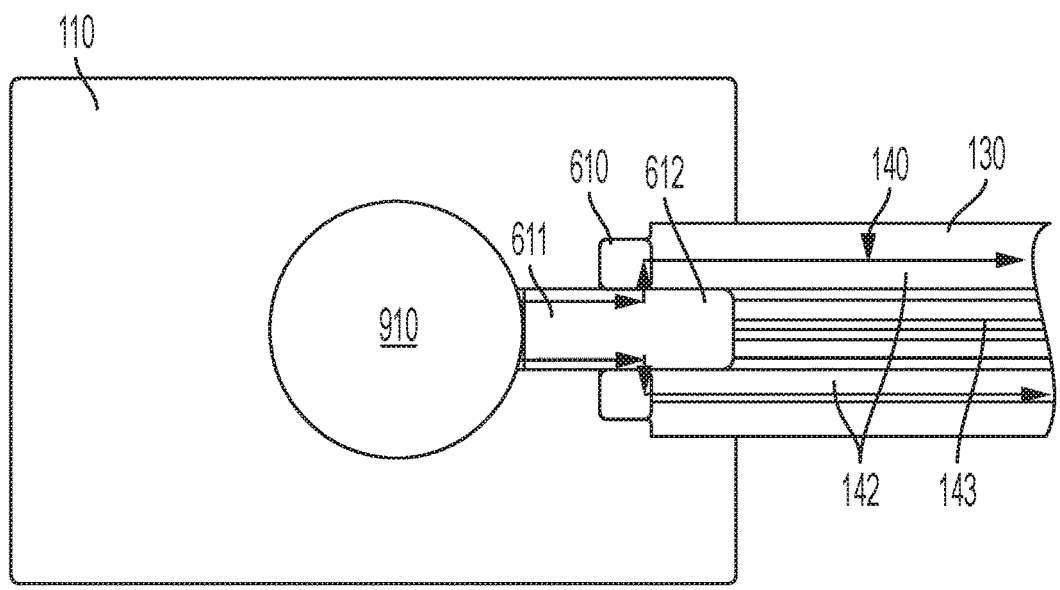
FIG. 8 is a side view of an orifice insert of FIGS. 6 and 7 interposed between an inlet header and a channel in accordance with embodiments.

With reference to FIGS. 6 and 7, an orifice insert 601 is provided and includes a center plug 610 and a ring feature 620. The center plug 610 has a first end 611, a second end 612 opposite the first end 611 and an exterior surface 613 that extends between the first and second ends 611 and 612. The exterior surface 613 has a curved plane P and is formed to define multiple inflow channels 630 that extend from the first end 611 toward the second end 612 and that terminate at termination points 631 defined midway between the first and second ends 611 and 612. Each of the multiple inflow channels 630 has a u-shaped cross-section 632 that is directed inwardly from the curved plane P. The ring feature 620 is disposed about the center plug 610 and the multiple inflow channels 630 and includes an axial face 621 and a radial face 622. The axial face 621 is adjacent to the center plug 610 and the multiple inflow channels 630. The radial face 622 is disposed at a distal edge of the axial face 621 and is oriented to face radially inwardly toward the center plug 610 and the multiple inflow channels 630. The ring feature 620 is thus disposed to define, with the center plug 610, a plenum 640 with which the termination points 631 of the multiple inflow channels 630 are fluidly communicative. The plenum 640 extends circumferentially about the center plug 610 and the multiple inflow channels 630. The multiple inflow channels 630 thus extend beneath the ring feature 620 in a radial dimension. The termination points 631 are axially aligned with the plenum 640 and can be scalloped or otherwise configured to direct fluid flow moving along the multiple inflow channels 630 radially outwardly and into the plenum 640.

The multiple inflow channels 630 are designed and configured to create a desired back pressure to achieve proper flow distribution among the channels 140 in the body 130 (see FIGS. 1 and 2). Fluid moving along one of the multiple inflow channels 630 flows from the first end 611 and toward the second end 612. The fluid passes beneath the ring feature 620 in a radial dimension and interacts with the corresponding termination point 631. This interaction causes the fluid to enter the plenum 640 and to flow in a circumferential direction.

Figure 9:
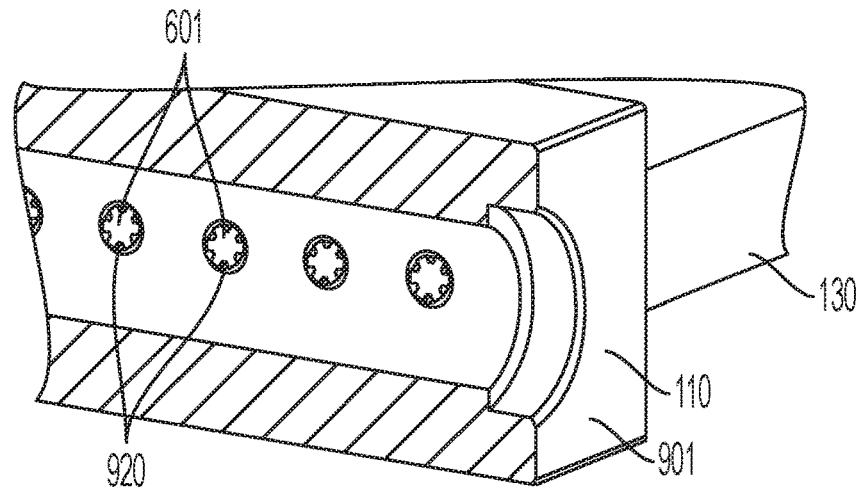
FIG. 9 is a perspective view of orifice inserts of FIGS. 6 and 7 interposed between an inlet header and channels in accordance with embodiments.
Figure 10:
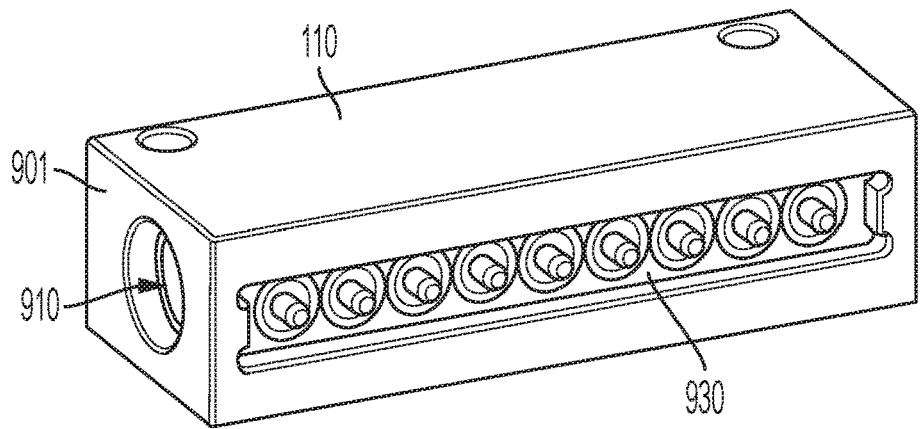
FIG. 10 is a perspective view of orifice inserts of FIGS. 6 and 7 seated in an external groove of an inlet header in accordance with embodiments.
Figure 11:
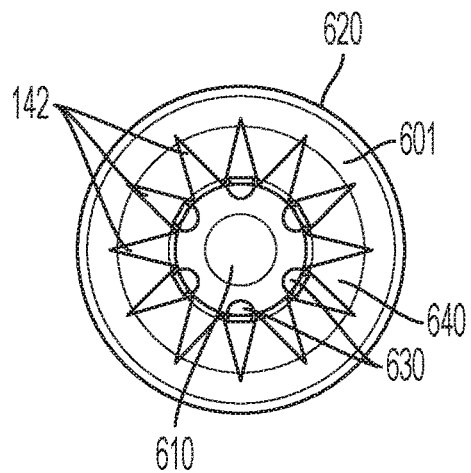
FIG. 11 is an axial view of an orifice insert and a grooved channel in the background to illustrate movement of liquid through the orifice insert in accordance with embodiments.

With reference back to FIG. 1 and with additional reference to FIGS. 8-11, orifice inserts 601 are respectively interposable between the inlet header 110 and a corresponding channel 140 in the body 130 of the evaporator element 101 (se FIG. 1). As shown in FIGS. 9 and 10, the inlet header 110 includes a header body 901 that is formed to define a central cavity 910 (see FIG. 8), apertures 920 for fluid communication between the central cavity 910 and the channels 140 and an external groove 930. The orifice inserts 601 are respectively insertable into corresponding ones of the apertures 920 and are seatable in the external groove 930 to respectively register with corresponding ones of the channels 140. Where the corresponding channel 140 has the grooves 142 as described above, the orifice insert 601 is disposed and configured to encourage fluid of the fluid flow from the inlet header 110 to the corresponding channel 140 to flow into the grooves 142 of the corresponding channel 140.

In an operation of the evaporator 101 with the orifice inserts 601 respectively interposed between the inlet header 110 and corresponding channels 140 in the body 130 of the evaporator element 101, liquid entering the inlet header 110 is distributed to each of the apertures 1120 by the central cavity 1110. Once the liquid enters an aperture 1120, the liquid is forced into the multiple inflow channels 630 and flows along the multiple inflow channels 630 to the termination points 631. The termination points 631 redirect the liquid into the plenum 640 whereupon the liquid is directed into the grooves 142 of the channels 140.

Technical effects and benefits of the features described herein are the provision of an evaporator with properly designed grooves that can be used in either terrestrial or microgravity environments. In microgravity environments, the grooves are capable of replenishing liquid to evaporating surfaces that ensure the evaporator operation is proper and efficient. In addition to this self-wetting capability, the addition of the groove surface areas increases the evaporative surface area and improves the evaporator performance in both the terrestrial and the microgravity environments.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An evaporator, comprising:
   an evaporator element, comprising:
   a body defining channels, each of which comprises grooves respectively delimited by first and second interior facing sidewalls of the body which form a base and an apex with an apex angle opposite the base and defined such that, for a fluid flow moving through one of the channels in a microgravity environment:
      a portion of the fluid flow in a liquid phase within a groove of the channel will move in the groove from the base to the apex, and
      a portion of the fluid flow in a vapor phase within a groove of the channel will move in the groove from the apex to the base,
   wherein the evaporator further comprises orifice inserts, each of which comprises:
   a center plug comprising a first end and a second end, which is opposite the first end and which extends into a corresponding one of the channels, and an exterior surface defining multiple inflow channels that extend from the first end and terminate at termination points midway between the first and second ends; and
   a ring feature disposed about the center plug and comprising a first side, beyond which the first end of the center plug extends, and a second side opposite the first side and defining a plenum with which the termination points of the multiple inflow channels are fluidly communicative,
   wherein the grooves are circumferentially arrayed to extend outwardly from an open central region and align with corresponding ones of the termination points of a corresponding one of the orifice inserts.

2. The evaporator element according to claim 1, wherein the channels are arrayed in a linear formation.

3. The evaporator element according to claim 1, wherein each of the channels has a same shape.

4. The evaporator element according to claim 1, wherein each of the grooves is immediately adjacent to neighboring grooves.

5. The evaporator element according to claim 1, wherein each of the grooves has a same shape.

6. The evaporator element according to claim 1, wherein the apex angle is $2\beta$ and $\beta$ is less than 90° minus a solid-liquid contact angle.

7. An evaporator, comprising:
   an evaporator element comprising a body defining channels, each of which comprises grooves respectively delimited by first and second interior facing sidewalls of the body which form an apex angle $2\beta$, where $\beta$ is less than 90° minus a solid-liquid contact angle; and
   an orifice insert comprising:
   a center plug comprising a first end and a second end, which is opposite the first end and which extends into a corresponding one of the channels, and an exterior surface defining multiple inflow channels that extend from the first end and terminate at termination points midway between the first and second ends; and
   a ring feature disposed about the center plug and comprising a first side, beyond which the first end of the center plug extends, and a second side opposite the first side and defining a plenum with which the termination points of the multiple inflow channels are fluidly communicative,
   wherein the grooves are circumferentially arrayed to extend outwardly from an open central region and align with corresponding ones of the termination points.

8. The evaporator element according to claim 7, wherein the channels are arrayed in a linear formation.

9. The evaporator element according to claim 7, wherein each of the channels has a same shape.

10. The evaporator element according to claim 7, wherein each of the grooves is immediately adjacent to neighboring grooves.

11. The evaporator element according to claim 7, wherein each of the grooves has a same shape.

12. An evaporator, comprising:
    first and second headers; and
    a body interposed between the first and second headers and defining channels to permit fluid flow between the first and second headers,
    each channel comprising grooves respectively delimited by first and second interior facing sidewalls of the body which form a base and an apex with an apex angle opposite the base and defined such that, for a fluid flow moving through one of the channels in a microgravity environment:
       a portion of the fluid flow in a liquid phase within a groove of the channel will move in the groove from the base to the apex, and
       a portion of the fluid flow in a vapor phase within a groove of the channel will move in the groove from the apex to the base, wherein the evaporator further comprises orifice inserts respectively interposable between one of the first and second headers and a corresponding channel and each orifice insert comprises:

a center plug comprising a first end and a second end, which is opposite the first end and which extends into a corresponding channel, and an exterior surface defining multiple inflow channels that extend from the first end and terminate at termination points midway between the first and second ends; and a ring feature disposed about the center plug and comprising a first side, beyond which the first end of the center plug extends, and a second side opposite the first side and defining a plenum with which the termination points of the multiple inflow channels are fluidly communicative, wherein each termination point of an orifice insert aligns with a corresponding groove of a corresponding channel.

13. The evaporator according to claim 12, wherein the channels are arrayed in a linear formation and each of the channels has a same shape.

14. The evaporator according to claim 12, wherein each of the grooves is immediately adjacent to neighboring grooves and each of the grooves has a same shape.

15. The evaporator according to claim 12, wherein the grooves are circumferentially arrayed to extend outwardly from an open central region.

16. The evaporator according to claim 12, wherein the apex angle is $2\beta$, where $\beta$ is less than 90° minus a solid-liquid contact angle.

* * * * *